Jan. 1, 1946.  G. T. DOWNEY  2,392,234
VALVE ASSEMBLY
Filed May 26, 1943  6 Sheets-Sheet 1

Inventor
G. T. Downey
By Kimmel & Crowell
Attorneys

Patented Jan. 1, 1946

2,392,234

UNITED STATES PATENT OFFICE 2,392,234

VALVE ASSEMBLY

George T. Downey, Corry, Pa., assignor to Aero Supply Mfg. Co. Inc., Corry, Pa.

Application May 26, 1943, Serial No. 488,604

10 Claims. (Cl. 251—125)

This invention relates to an improved valve assembly including a valve seat and a spring-pressed valve member.

An object of this invention is to provide an improved valve assembly which is moved to an open position by a rotary cam, the valve member being provided with a cam engaging stem part which is slidable in guide grooves carried by the valve seat so as to hold the valve member against rotation.

Another object of this invention is to provide an improved valve assembly which includes means whereby the valve member will be tilted when being moved to an open position so as to thereby reduce the pressure necessary to move the valve to open position.

A further object of this invention is to provide an improved assembly of this kind which is so constructed that it may be produced as a unit on an assembly line and then secured to the valve housing.

A further object of this invention is to provide a valve seat for an assembly of this kind which may be formed as an element separate from the valve housing and then pressed into position.

A further object of this invention is to provide an improved valve structure which is formed as a separate unit, the valve structure including a valve member of the tappet type, a combined guide and spring retainer and a spring between the retainer and the valve member for urging the valve member to a closed position.

A further object of this invention is to provide in combination with a grooved valve seat, a tappet valve member, and a valve operator pivotally secured to the valve member, the operator being of U shape with the legs thereof slidable in the grooves of the seat, and with one leg longer than the other leg so that the valve member will be tilted or cracked open, the operator being formed with an arcuate inner or bight portion extending diametrically of the inner end of the valve seat and a wear element secured to the bight portion.

With the foregoing objects and others which may hereinafter appear, the invention consists of the novel construction, combination and arrangement of parts as will be more specifically referred to and illustrated in the accompanying drawings, wherein are shown embodiments of the invention, but it is to be understood that changes, modifications and variations may be resorted to which fall within the scope of the invention as claimed.

Referring to the drawings, and first to Figures 1 to 4, the numeral 15 designates generally a valve housing having rotatable therein a cam shaft 16 on which a valve operating cam 17 is secured by means of a securing pin 18. The cam shaft 16 includes an outer extension 19 which is coupled to the shaft 16 by means of a splined coupling structure 20 so that any desired numbers of cam shafts may be coupled together in axially aligned position.

Figures 1, 3:
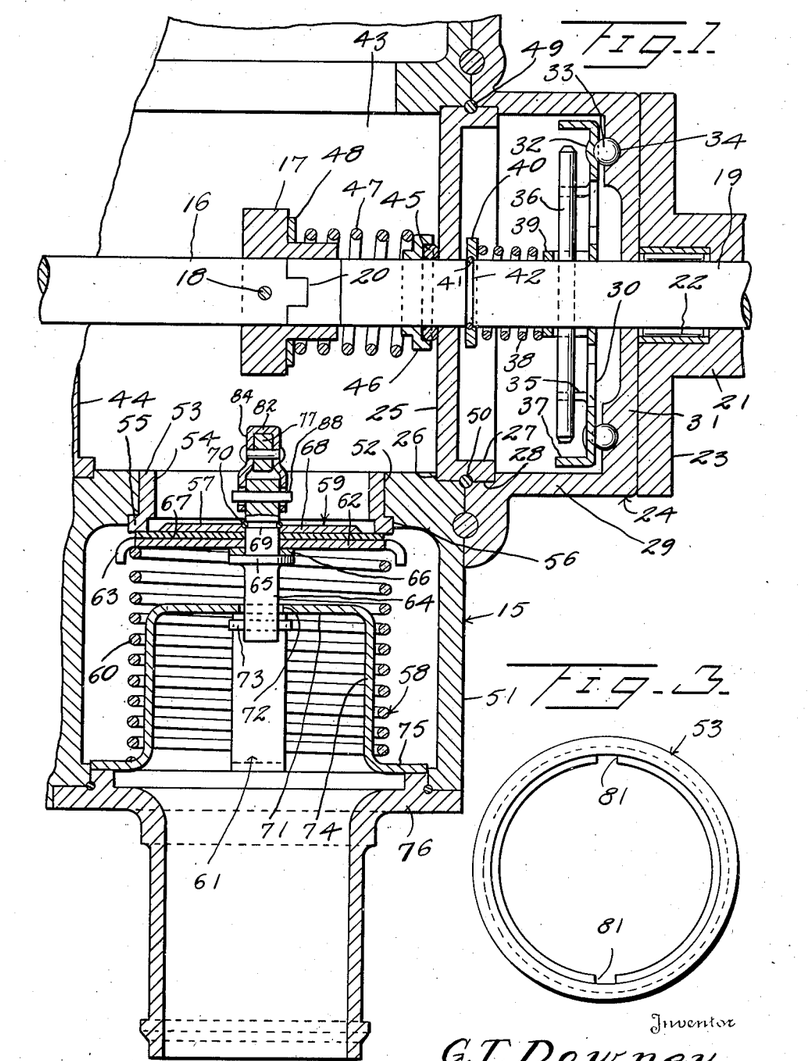
Figure 1 is a fragmentary sectional view of a valve structure embodying a valve assembly constructed according to an embodiment of this invention.
Figure 3 is a plan view of the valve seat.

The shaft 19 is journaled through a bearing boss 21 having roller bearings 22 therein, and the bearing boss 21 is formed with an inner flange 23 abutting against a housing 24 formed as a removable part of the valve housing 15. The housing part 24 is outwardly offset from a disc-shaped plate 25 which is seated in a rabbet 26 carried by the housing 15. The plate 25 also includes an annular flange 27 seating in a rabbet 28 carried by the cylindrical wall 29 of the outer housing part 24.

An index plate 30 is mounted on the shaft 19 inwardly of the outer wall 31 of the housing member 24 and the plate 30 is formed with a plurality of inwardly offset detents 32 in which balls 33 which engage in recesses 34 formed in the wall 31 are adapted to engage. The index plate 30 is provided with diametrically opposed pairs of inwardly projecting tongues 35 which engage on opposite sides of a pin 36 extending diametrically through the shaft 19. The plate 30 is also formed with opposed lugs 37 adjacent the opposite ends of the pin 36 which are adapted to limit the endwise movement of the pin 36 with respect to the shaft 19 and the plate 30. The plate 30 is yieldably held in engagement with the balls 33 by means of a spring 38 disposed about the shaft 19 and bearing at its outer end against a U-shaped member 39 which straddles the pin 36 and loosely engages at the bight thereof about the shaft 19. The inner end of the spring 38 bears against a washer or collar 40 mounted on the shaft 19 and is held against inward movement by means of a split retaining ring 41 engaging in an annular groove 42 formed in the shaft 19.

The cam 17 operates in a central chamber 43 which is formed in the housing 15 between the partition 25 and a second partition or wall 44. The chamber 43 is sealed to prevent fluid from flowing into the housing 24 by means of a ring-shaped sealing member 45 disposed about the shaft 19 on the inner side of the plate or wall 25. A cup-shaped seal retainer 46 is mounted on the shaft 19 and bears against the sealing member 45. A spring 47 bears at one end against the retainer 46 and at the other end against the cam 17. Preferably, a washer 48 is interposed between the inner end of the spring 47 and the adjacent side of the cam 17. An annular sealing ring 49 is mounted in an annular groove 50 formed in the flange 27 and is adapted to seal the wall 25 with respect to the housing 15 and prevent any leakage of liquid from the chamber 43 about the outer surface of the wall 25 and the flange 27.

The housing 15 includes an annular valve housing 51 which communicates at its inner end with the chamber 43. The housing 15 is formed with an opening 52 within which an annular valve seat 53 is adapted to be mounted. The valve seat 53 is pressed or otherwise firmly positioned in the recess or opening 52 so that the valve seat 53 will be held against movement with respect to the housing 15. The valve seat 53 includes a cylindrical body 54 which is formed at its outer end with an annular flange 55. The flange 55 is adapted to engage in a recess 56 formed outwardly of the opening 52. The outer portion of the cylindrical body 54 is also formed with an annular recess 57, the purpose for which will be hereinafter described.

Figure 4:
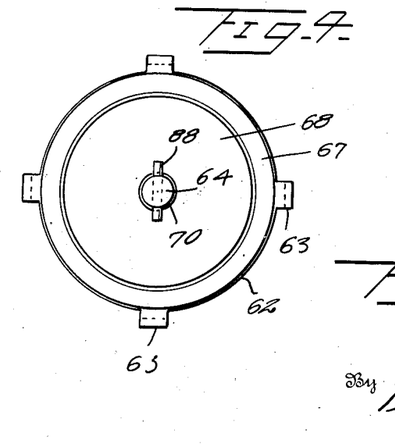
Figure 4 is an inner end elevation of the valve member with the yoke-shaped operator removed.

A valve assembly generally designated as 58 is mounted in the valve housing 51 and includes a valve member generally designated as 59 engageable on the outer end of the seat 53. The valve member 59 is constantly urged to a closed position by means of a spring 60 which engages about a spider generally designated as 61. The valve member 59 includes a valve plate 62 which is formed on the outer marginal edges thereof with outwardly directed tongues 63. The valve plate 62 has extending through the center thereof a valve stem 64 which is formed with a shoulder or flange 65. An outer sealing washer 66 is mounted on the stem 64 between the flange 65 and the outer side of the valve plate or member 62.

A valve gasket or sealing member 67 of disc-shaped construction is mounted on the stem 64 inwardly of the valve plate 62 and is tightly held against the inner side of the plate 62 by means of a clamping plate 68. The valve stem 64 is formed with an annular groove 69 within which a split locking ring 70 is adapted to engage, the locking ring 70 engaging against the inner side of the clamping plate 68. The spider 61 includes an inner plate or body 71 formed with a central opening 72 through which the valve stem 64 is adapted to loosely engage. The stem 64 is adapted to have lateral movement within the opening 72 during the opening of the valve member 59. A retaining pin 73 is extended diametrically through the valve stem 64 outwardly of the spider body 71 so that the spider body 71 with the spring 60 will be held in assembled position with respect to the valve member 59.

The inner end of the spring 60 is adapted to engage inwardly of the outwardly directed lugs or tongues 63 which are formed integral with the valve plate 62. The spider 71 also includes opposed pairs of outwardly directed parallel arms 74 which at their outer ends are formed with right angularly disposed arms 75. The arms 75 are adapted to bear against the inner end of a coupling housing 76 which is secured to the outer end of the valve housing 51.

Figure 2:
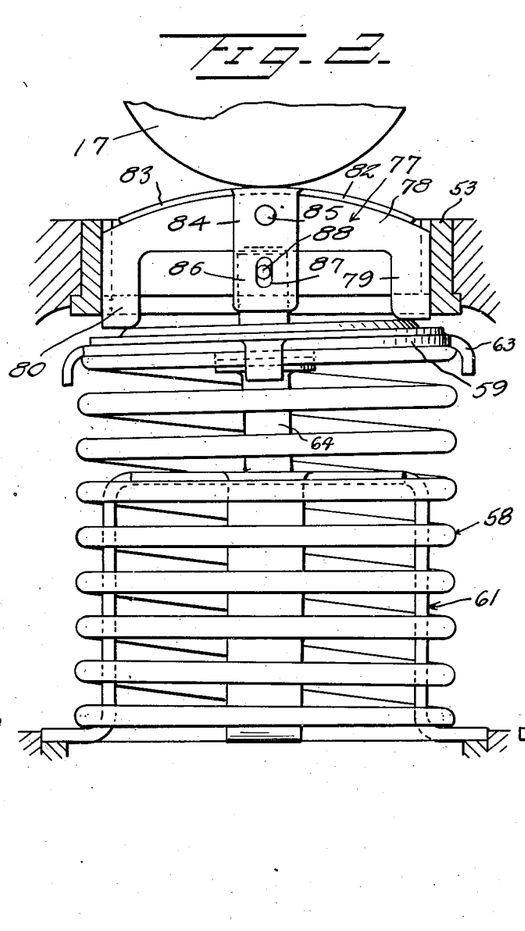
Figure 2 is a detail side elevation of the valve assembly in partly open position looking at right angles to the assembly shown in Figure 1.

The inner end of the valve stem 64 has loosely coupled thereto a yoke-shaped valve operator 77. The operator 77 includes an inner bight portion 78 formed with parallel outwardly directed arms 79 and 80 which slidably engage in diametrically opposed grooves or guide channels 81 formed in the valve seat 54. The inner edge of the bight portion 78 is formed on a long arc as indicated at 82, the inner edge 82 in the present instance having mounted thereon a longitudinally arcuate wear plate 83. The wear plate 83 is adapted to be engaged by the cam 17 when the cam 17 is rotated to a valve opening position. The wear plate 83 has formed integral therewith a pair of outwardly extending arms 84 which are secured by means of a rivet 85 to the bight 78. The arms 84 also include offset outer portions 86 formed with elongated openings 87. A pin 88 is extended through the inner end portion of the stem 64 and loosely engages in the opposed elongated openings 87 so that the stem 64 may have tilting movement with respect to the operator 77 when the latter is moved to a valve opening position.

Preferably, as shown in Figure 2 the arm 79 of the operator 77 is shorter in length than the arm 80 so that when the operator 77 is moved outwardly to a valve opening position, the longer leg 80 will initially strike the inner side of the clamping plate 68 so as to thereby crack open the valve member 59 from one side thereof, and further outward movement of the operator 77 by the cam 17 will move the valve 59 to an open position with the valve 59 still in a tilted position.

Figure 5:
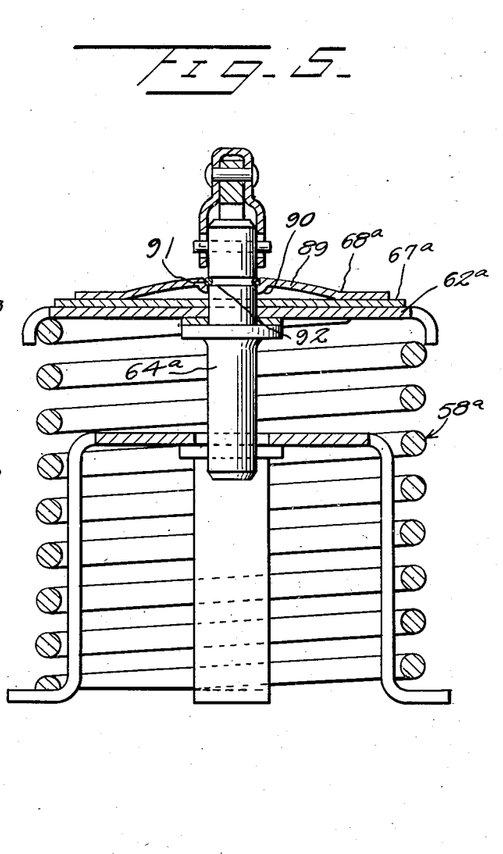
Figure 5 is a longitudinal section of a slightly modified form of this invention.

Referring now to Figure 5, there is disclosed a valve assembly, generally designated as 58a, which is similar in every detail to the valve assembly 58 with the exception that the valve gasket or sealing member 67a is held tightly against the valve plate 62a by means of a clamping plate 68a which is formed with an inwardly offset or cup-shaped central portion 89. The central portion 89 is formed with an inwardly offset rib 90 and a groove 91 is formed in the rib 90 within which a split locking ring 92 mounted on the valve stem 64a is adapted to engage. In other respects, the valve assembly 58a is identical with that shown in Figures 1 and 2 and the detailed description of the assembly 58 with the exceptions above noted will apply to the assembly 58a.

Figure 6:
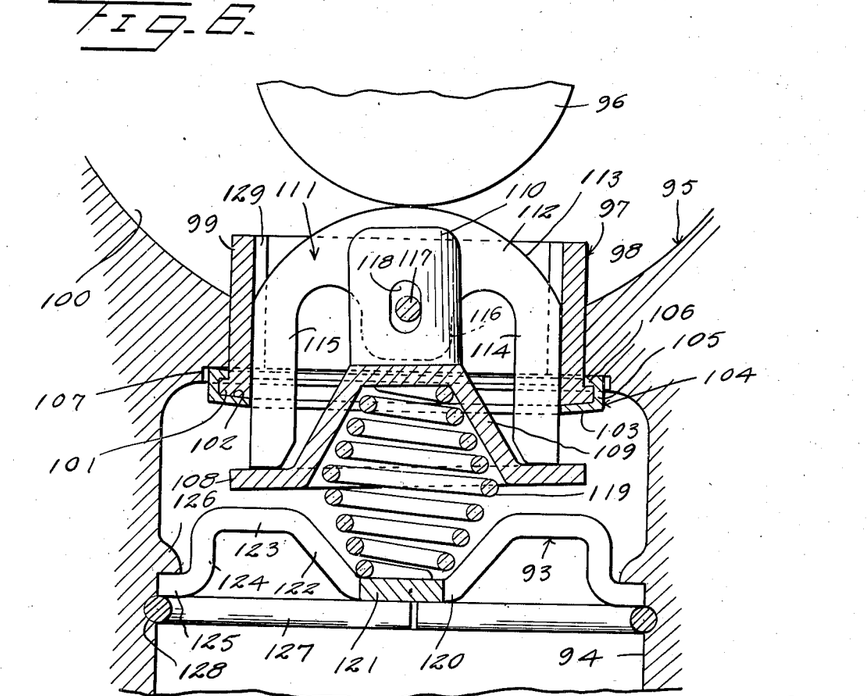
Figure 6 is a longitudinal section of another modification of this invention showing the valve member in open position.
Figure 7:
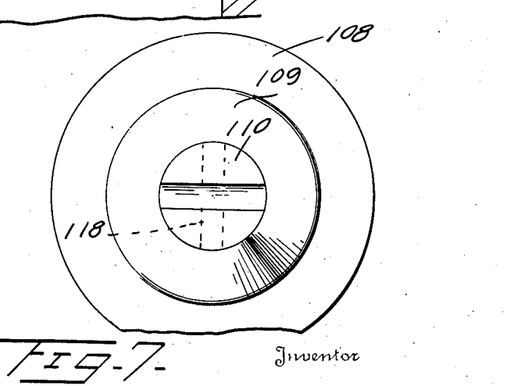
Figure 7 is an inner end elevation of the valve member embodied in Figure 6.

Referring now to Figures 6 and 7, there is disclosed another modified form of this invention which includes a valve assembly, generally designated as 93. The valve assembly 93 is disposed in an intake housing 94 of a valve housing structure 95 and is operated by means of a cam 96 mounted on a shaft similar to the shaft 16. A valve seat 97 is mounted in an opening 98 formed in the housing 95 and includes a cylindrical body 99 which is pressed into the opening 98 and may project inwardly into the central chamber 100 formed in the housing 95. The cylindrical body 99 is formed at its outer end with an annular flange 101, and preferably the outer side 102 of the flange 101 is angularly disposed so that the outer portion 103 of a substantially U-shaped gasket or sealing member 104 will be tilted with the smaller portion thereof innermost.

The sealing member 104 includes a bight portion 105 engaging the outer edge of the flange 101 and an inner leg 106 which is shorter in length than the outer sealing leg 103. The sealing member 104 is preferably of resilient construction so that it may be snapped over the flange 101 and the inner portion of the sealing member 104 is adapted to engage in an annular recess 107 formed in the housing 95.

A valve member 108 of annular configuration is adapted to seat against the outer side of the sealing member 104 and the valve member 108 is formed with an inwardly projecting frusto-conical body 109. A bifurcated stem 110 is carried by the inner truncated end of the body 109 and a U-shaped valve operator 111 is adapted to slidably engage between the bifurcations of the stem 110. The operator 111 includes an inner bight portion 112 formed with a convex inner edge 113 for engagement with the cam 96 and also includes parallel legs 114 and 115. The leg 114 is slightly shorter in length than the leg 115 so that when the operator 111 is moved outwardly to a valve opening position, the valve member 108 will be tilted, as shown in Figure 6, initially cracking open the valve from one side thereof.

The bight portion 112 also includes an outwardly projecting lug 116 through which a pin 117 extends. The pin 117 loosely engages in diametrically opposed elongated openings 118 which are formed in the stem 110. A spring 119 is adapted to seat in the outer open side of the cup-shaped member 109 and is also adapted to engage a spider 120. The spider 120 includes a central body 121 formed with inwardly divergent arms 122, outwardly directed arms 123 and right angular extensions 124. The extensions 124 have outwardly directed extensions 125 which are adapted to bear against an annular flange or rib 126 formed in the housing 94.

A split locking ring 127 engaging in an annular groove 128 formed in the housing 94 bears against the outer portions of the extensions 125 to firmly lock the spider 120 within the housing 94. The valve seat 97 is formed with a pair of diametrically opposed guide channels 129 within which the outer portions of the arms 114 and 115 are adapted to slidably engage.

Figure 9:
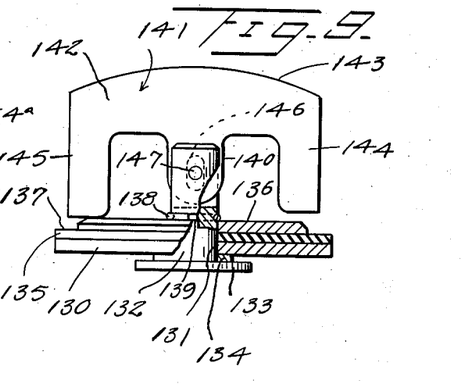
Figure 9 is a detail side elevation partly broken away and in section of a further modification of this invention.

Referring now to Figure 9, there is disclosed a further modified form of valve assembly which is adapted to be mounted in a valve housing, similar to the housings hereinbefore described, and urged to a closing position by means of a conventional spring (not shown). The valve assembly shown in Figure 9 includes a valve plate 130 which is formed with a central opening 131 through which a valve stem 132 is adapted to removably engage. The stem 132 at its outer end is formed with a head or annular flange 133 and the stem 132 is sealed with respect to the valve plate 130 by means of an annular sealing member 134 interposed between the head 133 and the outer side of the plate 130.

A disc-shaped valve gasket 135 is mounted on the stem 132 on the inner side of the valve plate 130, and a disc-shaped clamping plate 136 mounted on the stem 132 bears against the inner face of the sealing member 135. The clamping plate 136 is substantially smaller in diameter than the diameter of the sealing member 135 so as to thereby provide a valve seat engaging portion 137 outwardly of the marginal edge of the clamping plate 136. The clamping plate 136 is held in clamping position by means of a split locking ring 138 mounted in an annular groove 139 formed in the stem 132. The inner portion of the stem 132 is bifurcated to receive an outwardly projecting lug 140 carried by a valve operator 141. The operator 141 includes an inner bight portion 142 formed with a convex cam engaging inner edge 143 and also includes outwardly directed parallel legs 144 and 145. The leg 144 is substantially shorter in length than the leg 145 so that when the operator 141 is moved outwardly, the valve member will be tilted and cracked open from one side thereof and maintained in a tilted position when the valve is open. The lug 140 is formed with an elongated slot 146 through which a holding pin 147 engaging through the inner portion of the stem 132 loosely engages.

Figure 8:
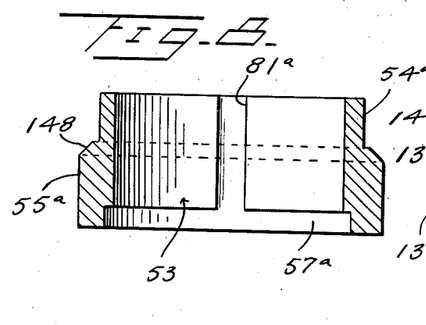
Figure 8 is a longitudinal section of a modified form of valve seat used with any one of the forms of valve assemblies herein disclosed.

Referring now to Figure 8, there is disclosed a modified form of valve seat 53a which includes a cylindrical body 54a formed with a pair of opposed guide channels 81a. The body 54a has formed integral therewith an elongated annular flange 55a which is beveled, as at 148 at the inner end thereof. The outer portion of the flange 55a is formed with an annular recess 57a within which the clamping plate of the valve assembly is adapted to loosely engage.

Figure 10:
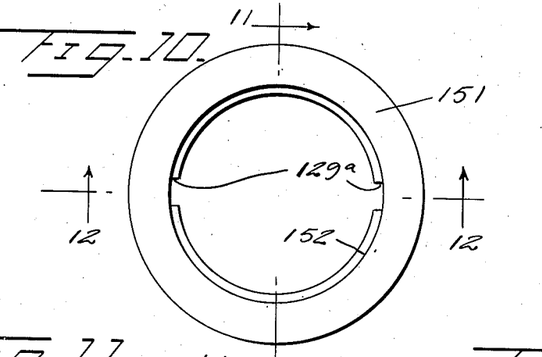
Figure 10 is an outer end elevation of a further modified form of valve seat.
Figures 11, 12:
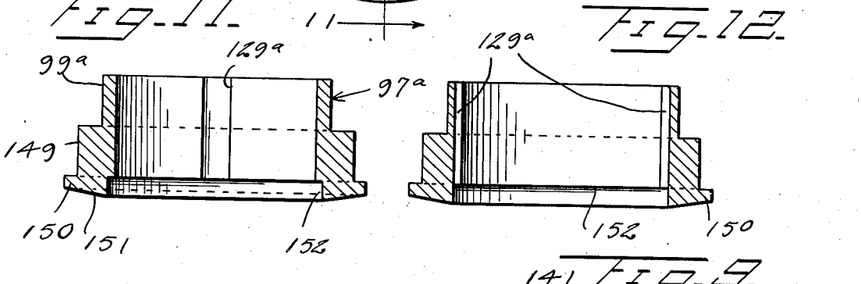
Figure 11 is a sectional view taken on the line 11—11 of Figure 10.
Figure 12 is a sectional view taken on the line 12—12 of Figure 10.

Referring now to Figures 10 to 12, there is disclosed another form of valve seat structure 97a which includes an annular body 99a provided with opposed guide channels 129a. The body 99a is formed with an enlarged outer body portion 149 and the body portion 149 is formed at its outer end with an annular flange 150 having a tapered or beveled seat 151. An annular recess 152 is formed in the outer portion of the body 149 within which the clamping plate of the valve structure is adapted to loosely engage.

In the use and operation of this valve assembly, the assembly 58 may be completely assembled as a unit before insertion in the housing 51. The spider 61 is mounted on the stem 64 and locked thereon by means of the locking pin 73. The spring 60 is interposed between the outwardly directed arms 75 of the spider and the valve plate 62, engaging within the outwardly directed lugs 63. In closed position the valve gasket 67 will be held firmly on the seat 53 by the spring 60, and at this time the valve stem 64 will be coaxial with the valve seat 53. When the cam shaft 16 is rotated to engage the cam 17 with the operator 77, the operator 77 will be moved outwardly and initially the long leg 80 formed integral with the operator 77 will contact the clamping plate 59 so as to crack open the valve 59 from one side thereof.

Further outward movement of the operator 77 will bring the shorter leg 79 into contact with the clamping plate 68 at a point diametrically opposite the point of contact of this plate by the longer leg 80. The valve member 59 will thus be maintained in a tilted position during the entire time that the valve member is in open position. The relatively large opening 72 in the spider 61 will permit the outer end portion of the stem 64 to swing laterally as the valve member 59 is being tilted.

The novel assembly of the valve member which includes the plate 62, stem 64, gaskets 66 and 67 with the clamping plate 68 which is locked by the locking ring 70 permits the ready assembly of the valve member. In the event of a leakage between the valve gasket 67 and the seat 53, a new gasket may be applied to the valve plate 62 by uncoupling the operator 77 and then opening the split ring 70 to release the clamping plate 68.

The valve assembly hereinabove described has been designed particularly for use with liquids, such as gasoline, oil or the like and by providing the long arc on the inner end of the operator 77 the valve structure is more easily moved to an open position by means of the cam 17. Furthermore, by providing for the initial cracking open of the valve 59, the spring 60 may be of lighter construction as when the valve 59 is in a closed position the pressure on the outer side thereof will coact with the spring 60 in holding this valve in a sealed position.

The initial cracking or tilting of the valve being moved to an open position also eliminates considerable strain on the cam shaft 16 so that a smaller torsional strain need be applied to the shaft 16 when the valve is moved to an open position. This reduction of torsional strain is particularly important when a number of these valve assemblies are embodied in a single housing, being disposed in side by side relation and operated from a common cam shaft.

Figures 15, 16, 17, 18, 19:
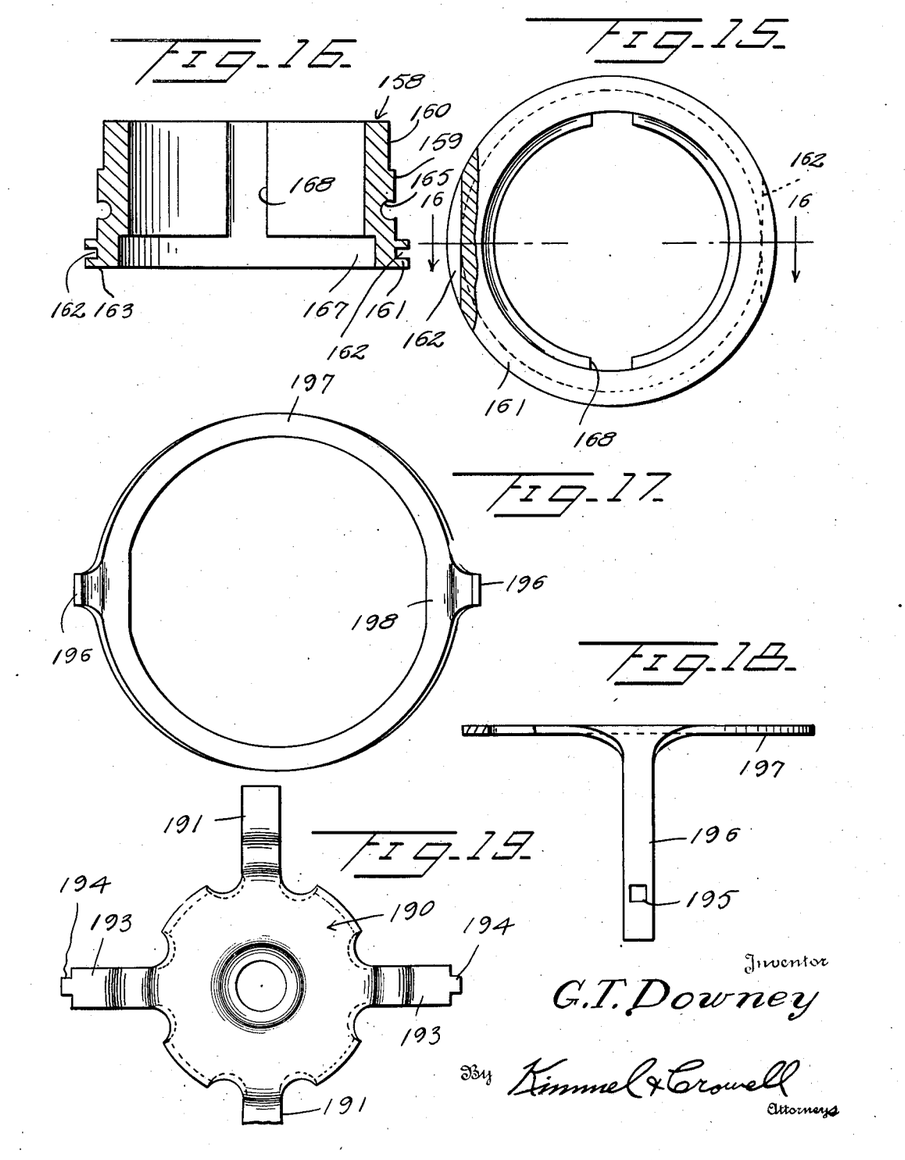
Figure 15 is a plan view partly broken away and in section of the valve seat used with the form shown in Figure 13.
Figure 16 is a sectional view taken on the line 16—16 of Figure 15.
Figure 17 is a plan view of the bracket for holding the valve structure in assembled position.
Figure 18 is a detail side elevation partly broken away of the bracket.
Figure 19 is a fragmentary plan view of the spider used with this form of the invention.

Referring now to Figures 13 to 19, inclusive, the numeral 153 designates generally a valve housing having a port 154 and an opening 155 communicating the port 154 with the inner portion of the housing 153. A rotary cam 156 is disposed in the central fluid chamber 157 with which the opening 155 communicates. A valve seat 158 is removably mounted in the opening 155 and comprises a cylindrical body 159 formed with a reduced diameter inner portion 160. An annular flange 161 is carried by the outer end of the body 159 and a pair of oppositely facing straight grooves 162 are cut into the flange 161, as shown in Figure 15.

Figures 13, 14:
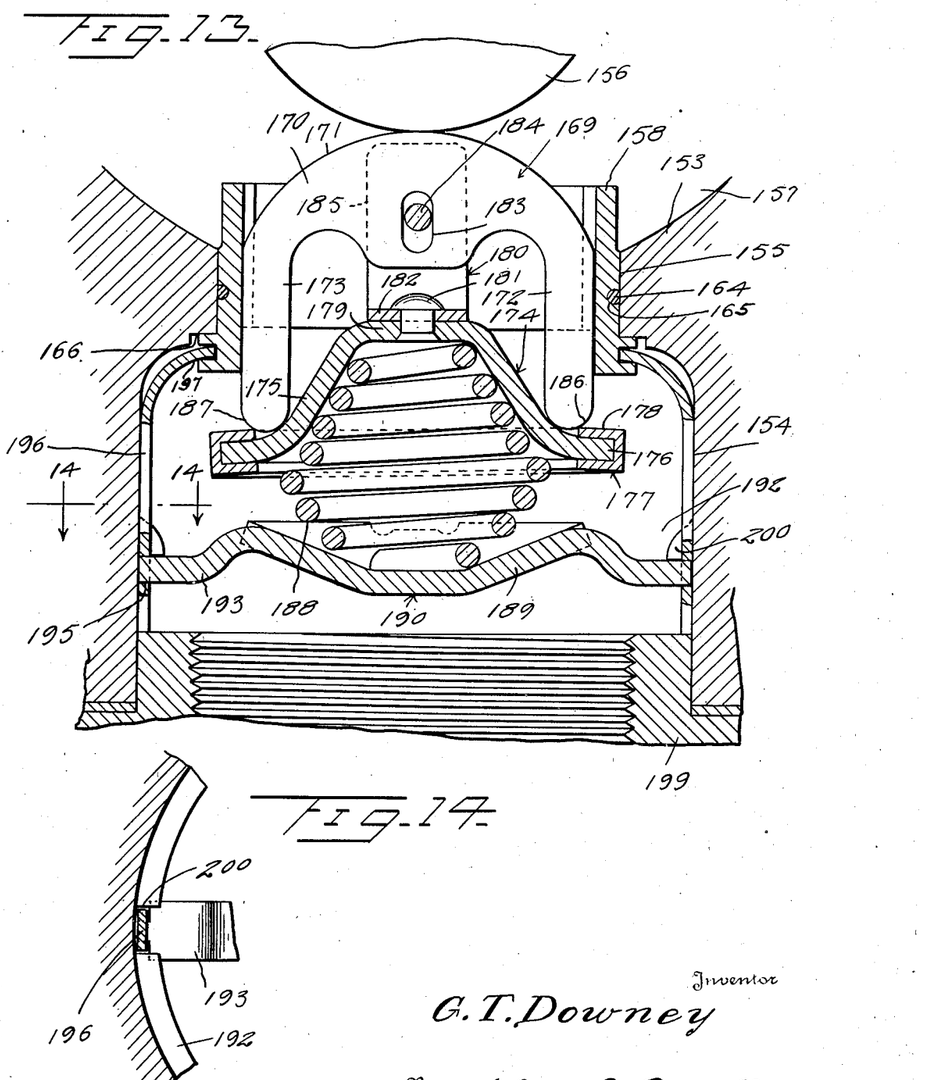
Figure 13 is a fragmentary sectional view of a modification of the structure shown in Figure 6.
Figure 14 is a fragmentary sectional view taken on the line 14—14 of Figure 13.

The outer side 163 of the body 159 forms the valve seat against which the movable valve member, to be hereinafter described, is adapted to engage. The valve seat 158 is adapted to be sealed in the opening 155 by means of an annular ring 164 which is mounted in an annular groove 165 formed in the periphery of the body 159 inwardly from the flange 161. The annular groove 165 is greater than a half circle in transverse section so that the sealing ring 164 will be compressed into the groove 165 when the seat 158 is in operative position.

The body 153 is formed with an annular shoulder 166 at the outer portion of the opening 155 within which the flange 161 is adapted to engage. The seat 158 is formed with an annular recess 167 and the seat 158 is also formed with a pair of lengthwise extending grooves or guide channels 168 within which a valve operator 169 of U-shape construction is adapted to slidably engage. The operator 169 includes a bight or inner portion 170 having a convex inner edge 171 with which the cam 156 is adapted to engage. The operator 169 includes parallel legs 172 and 173 which are of unequal length, the leg 172 being shorter than the leg 173. A valve member generally designated as 174 is adapted to engage on the seat 163 and includes a substantially frusto-conical valve body 175 having a flange or flared base portion 176.

A valve gasket or sealing member 177 which is U-shaped in transverse section is adapted to encompass the flange 176 and the inner side 178 of the gasket or the sealing member 177 is adapted to engage on the seat 163 when the valve member is in a closed position. The valve member 174 also includes a flat inner end 179 having secured thereto a U-shaped stem member 180. In the present instance, the stem 180 is formed separate from the valve member 174 and is secured to the flat inner end 179 by means of a rivet or fastening member 181 which engages through the bight 182 of the stem forming member 180.

The bight 170 of the operator 169 is formed with an elongated opening 183 through which a pin 184 carried by the opposite legs 185 of the U-shaped member 180 is adapted to loosely engage. The loose coupling formed by the bifurcated stem 180 and the pin 184 permits the valve member 174 to tilt as it is being moved from its seat to an open position. In the present instance, the outer ends of the legs 172 and 173 are rounded off, as indicated at 186 and 187, respectively.

The valve member 174 is constantly urged to a closed position by means of a spring 188. The inner end of the spring 188 seats in the hollow outer side of the valve member 174 and the outer end of the spring 188 seats in a confronting cup-shaped spring seat 189. The spring seat 189 is formed as an integral part of a spider generally designated as 190. The spider 190 has an opposed pair of arms 191 which are adapted to engage on an annular flange or shoulder 192 formed in the port 154 outwardly of the seat 158. The spider 190 is also formed with a second opposed pair of arms 193 having the outer ends thereof reduced as at 194 to provide lugs or keys which are adapted to engage in openings 195 formed in a pair of outwardly extending parallel arms 196.

The arms 196 are formed integral with a ring or annular retaining member 197 which is formed with opposed flat portions 198 engageable in the grooves 162. The arms 196 hold the spider 190 against movement relative to the seat 158 and thereby provide a means whereby the valve assembly will be held in its assembled position for insertion or removal from the valve housing 153. A coupling or fitting 199 is adapted to engage in the outer end of the port 154 and the inner end of the fitting 199 is adapted to abut against the outer ends of the retainer arms 196.

As will be noted from Figure 13, the arms 191 and 193 of the spider 190 are outwardly offset from the base or inner side of the spring seat 189. The annular flange or shoulder 192 which is formed in the housing 153 is provided with a pair of opposed openings or slots 200 within which the arms 196 are adapted to loosely engage.

The operation of the assembly shown in Figures 13 to 19 inclusive is similar to the operation of the assembly shown in Figure 1. In other words, when the cam 156 is rotated to move the operator 169 outwardly, the operator 169 will slide outwardly in the guide channels 168 of the seat 158. Initially, the valve member 174 will be disposed flat on the seat 163 being held tightly thereon by the spring 188. When the long leg 173 contacts with the valve member 174, this member will be cracked open from one side thereof as hereinbefore described and continued outward movement of the operator 169 will bring the short leg 172 into engagement with the valve member 174 so that the latter will be moved to a completely open position when the valve member is tilted.

The provision of the U-shaped gasket or sealing member 177 provides an improved means for renewal of the seal between the valve member 174 and the seat member 158. This assembly can be made as a unit apart from the housing 153 and readily inserted in the port 154 with the seat member 158 sealed within the opening 155 by means of the compressible seal member 164.

By using an improved seat member with a seal mounted in a groove between the inner and outer ends of the seat member the latter need not be tightly pressed into the valve opening 155 as is the case with prior valve constructions.

What I claim is:

1. In combination, a housing, a valve seat in said housing formed with a pair of opposed guide channels, a tappet valve member engageable on said seat, said member including a head, and a stem fixed to said head, and means loosely coupled to said stem, slidable in said channels and engageable with said head for tilting said head when the latter is moved to open position, said means being contained entirely within said housing.

2. In combination, a valve seat formed of a cylindrical body and a flange at one end thereof, said body having opposed longitudinal grooves, a gasket encompassing said flange, a valve member engageable against said gasket, and a U-shaped operator carried by said valve member and slidable in said grooves.

3. In combination, a valve seat formed of a cylindrical body and an annular flange at one end of said body, a valve gasket U-shaped in transverse section encompassing said flange, a valve member engageable on said gasket, a bifurcated stem carried by said valve member, a U-shaped operator loosely mounted between the bifurcations of said stem, said body having opposed lengthwise grooves in the inner side thereof and said operator having the legs thereof slidable in said grooves with the free ends thereof confronting the inner side of said valve member, and one leg of said operator being longer than the other leg whereby said valve member will be tilted when moved to an open position.

4. The combination set forth in claim 2 wherein the legs of said operator are adapted to contact with said valve member, and are of unequal length to thereby effect a tilting of said valve member when the latter is moved to open position.

5. In combination, a valve seat formed with a pair of guide channels, a tappet valve member engageable on said seat, said member including a head and a stem fixed to said head, a U-shaped valve operator having the opposite legs thereof slidable in said channels and adapted to contact said head, one of said legs being shorter than the other leg whereby upon movement of said operator to valve opening position said valve member will be tilted, and means loosely coupling said operator to said stem.

6. In combination, a valve seat formed with a pair of guide channels, a tappet valve member engageable on said seat, said member including a head and a stem fixed to said head, a U-shaped valve operator having the opposite legs thereof slidable in said channels and adapted to contact said head, one of said legs being shorter than the other leg whereby upon movement of said operator to valve opening position said valve member will be tilted, means loosely coupling said operator to said stem, and a wear element carried by the edge opposite the legs of said operator.

7. In combination, a housing, a valve seat in said housing formed with a pair of guide channels, a tappet valve member engageable on said seat, said member including a head and a stem fixed to said head, a U-shaped valve operator disposed entirely within said housing and having the opposite legs thereof slidable in said channels and adapted to contact said head, one of said legs being shorter than the other leg whereby upon movement of said operator to valve opening position said valve member will be tilted, the bight of said operator having a convex inner edge, and means coupling said operator to said stem whereby said operator may have slight endwise movement independent of said valve member to thereby assure initial engagement of the longer leg of said operator with said valve member for effecting an initial tilting of the latter.

8. A valve asembly comprising a valve member formed of a head, a stem extending from opposite sides of said head, means rockably carried by one end of said stem and engageable with an operator for effecting a tilting of said head upon movement of the latter to open position, a spider loosely carried by the opposite end of said stem and engageable with a stationary part, and a spring interposed between said spider and said head for normally urging said head to seat engaging position.

9. In combination, a valve seat formed of a cylindrical body and a flange at one end thereof, said body having opposed longitudinal grooves, a gasket encompassing said flange, a valve member engageable against said gasket, and a U-shaped operator carried by said valve member and slidable in said grooves, the legs of said operator adapted to contact said valve member, said operator having one leg thereof longer than the other leg whereby said valve member will be tilted upon movement of the latter to open position.

10. In combination, a seat, a valve member engageable on said seat comprising a disc-shaped body formed with a frusto-conical central portion on the seat engageable side of said disc-shaped body, a bifurcated stem carried by the truncated portion of said central portion, and a U-shaped operator loosely coupled to said stem and having the legs thereof adapted to contact said disc-shaped body, the opposed legs of said operator being disposed outwardly of said central body portion, and one leg of said operator being longer than the other leg whereby said valve member will be tilted upon movement to open position.

GEORGE T. DOWNEY.